United States Patent

Bauer

[11] Patent Number: 5,920,172
[45] Date of Patent: Jul. 6, 1999

[54] PATH FINDING METHOD FOR A SELF-PROPELLED MOBILE UNIT

[75] Inventor: Rudolf Bauer, Neubiberg, Germany

[73] Assignee: Siemens Aktiengesellschaft, Munich, Germany

[21] Appl. No.: 08/760,138

[22] Filed: Dec. 3, 1996

Related U.S. Application Data

[63] Continuation of application No. 08/428,034, Apr. 25, 1995, abandoned.

[30] Foreign Application Priority Data

May 3, 1994 [DE] Germany .............................. 44 15 497

[51] Int. Cl.$^6$ .................................................. B64C 13/18
[52] U.S. Cl. ........................ 318/587; 318/568.12; 901/1; 701/23
[58] Field of Search ..................... 318/580–587, 318/560, 567, 568.1, 568.4, 568.12; 901/1, 46–47; 701/1, 2, 22–23, 41

[56] References Cited

U.S. PATENT DOCUMENTS

| | | | |
|---|---|---|---|
| 4,662,854 | 5/1987 | Fang .......................................... | 446/175 |
| 5,107,946 | 4/1992 | Kamimura et al. ...................... | 318/587 |
| 5,502,638 | 3/1996 | Takenaka ........................... | 364/426.033 |
| 5,545,960 | 8/1996 | Ishikawa ................................ | 318/587 |
| 5,642,489 | 6/1997 | Bland et al. ............................. | 395/308 |

OTHER PUBLICATIONS

IEEE Transactions on Robotics Automation, vol. 7, No. 4, Aug. 1991, "Histogrammic Motion Mapping for Mobile Robot Obstacle Avoidance", J. Borenstein and Yoram Koren, pp. 535–539.

Schildkröte, Elektor Heft 1, Jan. 1974, pp. 1–36 to 1–42. untranslated.

*Primary Examiner*—David Martin
*Attorney, Agent, or Firm*—Hill & Simpson

[57] ABSTRACT

With the improved path finding method a self-propelled mobile unit determines a path around obstacles. A heuristic avoidance strategy is used, whereby the mobile unit, when encountering an obstacle, first evades by taking a first direction and implements an avoidance procedure up to a limit value if it cannot move around the obstacle. Subsequently, the unit returns to the point of departure of the avoidance maneuver and attempts to evade in the other direction. If it is likewise not possible to move around the obstacle in this direction before the limit value is reached, the barrier for the deviation in the avoidance maneuver is incremented. The unit then again attempts to move around the obstacle, first in the original avoidance direction. The limit value is increased again after respectively two more abortive attempts. The procedure is implemented until a path around the obstacle has been found and the destination can be reached. This avoids situations wherein a self-propelled mobile unit remains captured in an endless loop due to an avoidance maneuver in front of an extensive obstacle, whereby it attempts to move around the obstacle toward the right and toward the left but is prevented by the evasion limit from covering enough distance to move around the obstacle.

1 Claim, 3 Drawing Sheets

PATH FINDING METHOD FOR A SELF-PROPELLED MOBILE UNIT

BACKGROUND OF THE INVENTION

This is a continuation of application Ser. No. 08/428,034 filed Apr. 25, 1995, now abandoned.

There are currently many different uses for autonomously operating mobile units. Such uses of mobile units include remote reconnaissance probes, mobile units that operate in hazardous areas, self-propelled industrial vacuum cleaners, transport vehicles in manufacturing and, last but not least, of self-propelled robots. However, in order to be able to carry out a meaningful job in an environment that is unknown a priori, a self-propelled mobile unit must always be able to find its way in extremely complex and unstructured environments. The mobile unit must be able to discern a travel path between two points at any give time. Since an a priori map is generally not available, such a self-propelled mobile unit must be equipped with sensors which make it possible for the unit to flexibly interact with its environment. A few such sensors are, for example, laser range scanners, video cameras and ultrasound sensors.

One method for the orientation of self-propelled mobile units in unknown environments is that the unit constructs a two-dimensional grid of its environment and provides individual cells of this grid with occupation values. The occupation values assigned per grid cell represent the occurrence of obstacles in the environment. Such a method for the orientation of self-propelled units in grid maps is described in the publication by J. Borenstein and Yoram Koren, "Histogrammic in Motion Mapping for Mobile Robot Obstacle Avoidance", IEEE Transactions on Robotics Automation, Vol.7, No.4, August 1991.

A further problem derives from the implementation of evasive maneuvers when encountering obstacles on the travel path. The route planning of the mobile unit is significantly determined by the maneuverability thereof, by the selected destination and by the obstacles on the route. Even given extensive obstacles, the mobile unit should always be capable of finding a way to move around them.

SUMMARY OF THE INVENTION

It is an object of the present invention to provide an improved path finding method with which a self-propelled mobile unit seeks a route for moving around obstacles.

In general terms the present invention is a method for a path finding method for a self-propelled mobile unit, comprising the steps of:

prescribing a destination direction for the self-propelled mobile unit;

moving the self-propelled mobile unit in the destination direction until it encounters an obstacle in its path;

deviating the self-propelled mobile unit from the destination direction in a first direction, which is different from the destination direction, proceeding from a point of departure in front of the obstacle in order to move around the obstacle;

moving the self-propelled mobile unit in the first direction;

returning the self-propelled mobile unit, if the self-propelled mobile unit cannot move around the obstacle before reaching a predetermined first directional deviation limit, to the point of departure;

deviating the self-propelled mobile unit from the destination direction in a second direction, which is different than the first direction and which is different from the destination direction, proceeding from the point of departure in order to move around the obstacle;

moving the self-propelled mobile unit in the second direction;

returning the self-propelled mobile unit, if the self-propelled mobile unit cannot move around the obstacle before reaching the first directional deviation limit, to the point of departure;

incrementing the directional deviation limit after respectively two abortive attempts, the directional deviation limit being incremented in order to seek a travel path that allows the self-propelled mobile unit to move around the obstacle; and repeatedly moving the self-propelled mobile unit in the fist direction and then in the second direction and then incrementing the directional deviation limit, until the self-propelled mobile unit moves around the obstacle;

wherein deviation from the destination direction is cancelled after the self-propelled mobile unit has moved around the obstacle and wherein the self-propelled mobile unit then continues to move in the destination direction.

Advantageous developments of the present invention are as follows.

The path finding method is repeatedly implemented until the self-propelled mobile unit reaches a destination location.

The path finding method further comprises prescribing a destination direction and a destination distance from the starting location to a destination location.

In one embodiment of the path finding method the directional deviation limit is an angle deviation from the destination direction. In another embodiment the directional deviation limit is a path distance from the point of departure.

One advantage of the inventive method is that the evasive maneuver is displaced onto a reactive level of the self-propelled mobile unit. Thus, when a hierarchical control is present, it is not burdened with simple evasive maneuvers. This saves calculating time and, for example, continues to allow the evaluation of received sensor data from range-measuring devices and further planning activities on higher hierarchy levels.

The method also offers the advantage that it can also be applied without exact knowledge of the environment. Only a starting position of the self-propelled mobile unit and a target direction need be known. This simplicity, however, does not have a limiting effect. Rather, it also allows the use of the present invention in conjunction with different orientation methods, for example cellularly structured environment maps or environment maps based on stereo sensors.

It is beneficial to repeatedly apply the inventive method in order to find a route from a starting point to a destination since several obstacles can be present on this path and a favorable route can thus be found in any case.

In order to more precisely reach a destination, it is recommend to specify the distance from the target in addition to specifying the target direction, since a more exact evaluation of the motion sequences for homing in on the target is thus possible.

The providing of a deviation angle from the target direction or, respectively, the providing of a deviation distance can be employed as an especially simple limitation for the deviation since it is easy to check.

BRIEF DESCRIPTION OF THE DRAWINGS

The features of the present invention, which are believed to be novel, are set forth with particularity in the appended claims. The invention, together with further objects and advantages may best be understood by reference to the following description taken in conjunction with the accompanying drawings, in the several Figures of which like reference numerals identify like elements, and in which:

DESCRIPTION OF THE PREFERRED EMBODIMENTS

FIGS. 1a through 1d show the path finding of a self-propelled mobile unit SE from a starting location S to a destination Z in four steps. An obstacle H is located in the path of the mobile unit SE between the starting location S and the destination Z. It can be seen from FIG. 1a that the self-propelled mobile unit SE first moves from the starting location S to the location AP in a destination direction. On the course of its travel path, it detects the obstacle H that is located between the starting locations and the destination Z. The mobile unit SE now initiates an avoidance maneuver toward the left. An obstacle can preferably be detected by ultrasound or by laser range-measuring devices. The avoidance procedure is implemented until a first directional deviation limit is reached at point A. Such a directional deviation limit is defined, for example, as a deviation angle ANG 1 from the predetermined direction of travel between the starting locations and the destination Z. Alternatively, the directional deviation limit is defined as the travel distance that is measured from a point at which the self-propelled mobile unit deviates from the direction of travel.

Figure 1A:
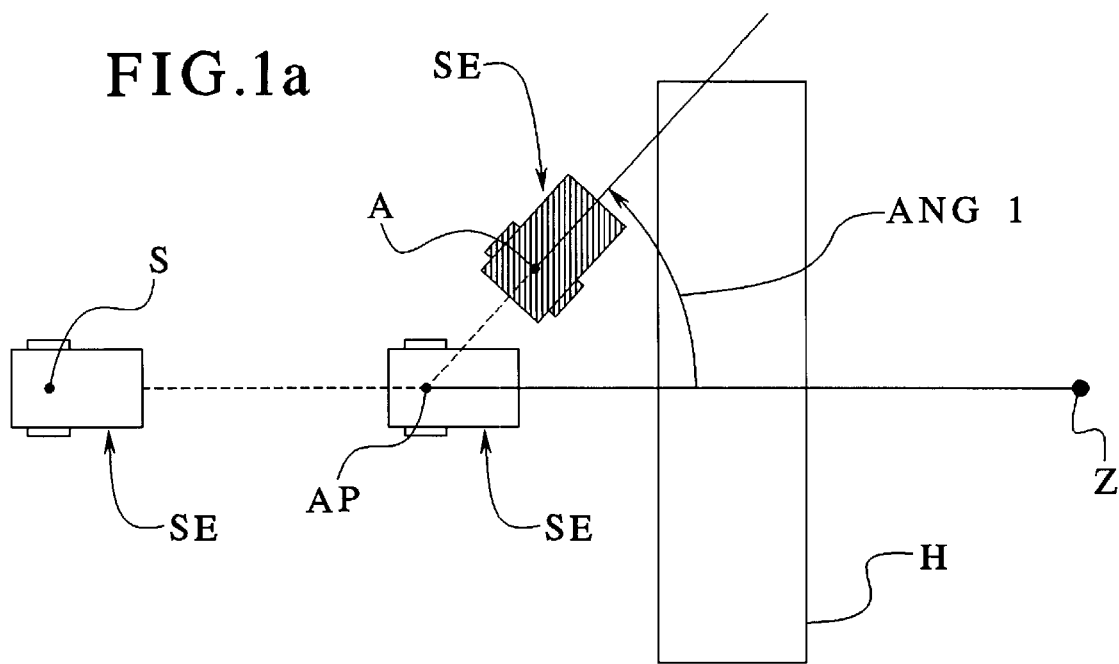
FIGS. 1a–1d depict an example of the steps of path finding by a self-propelled mobile unit according to the present invention.
Figure 1B:
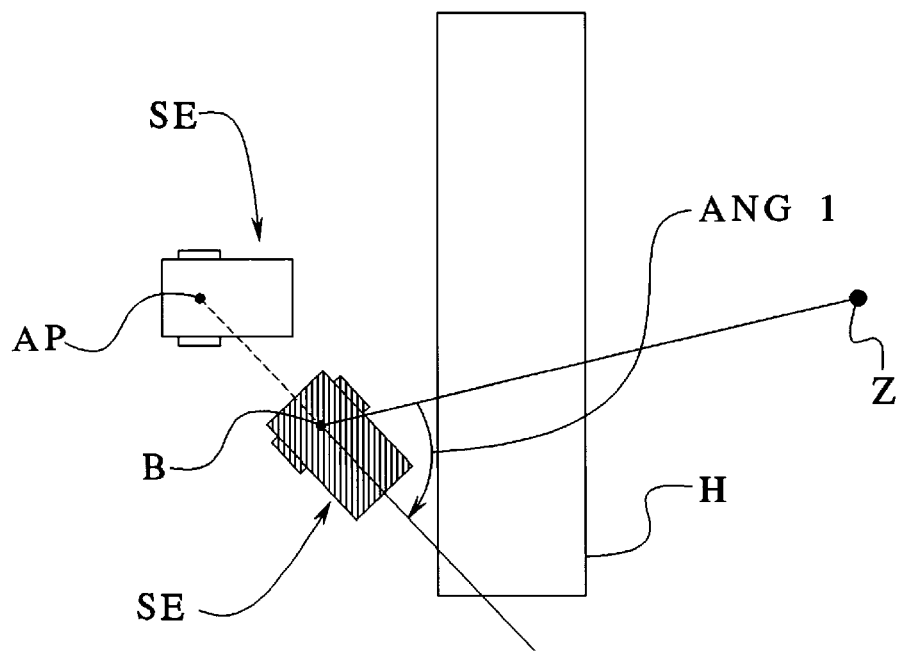

It is shown in FIG. 1b that the self-propelled mobile unit returns to its point AP of departure after transgressing the directional deviation limit, and then attempts to travel around the obstacle H in the other direction proceeding from point AP. It thus reaches the point B at which the first directional deviation limit (angle ANG 1) is again transgressed.

Figure 1C:
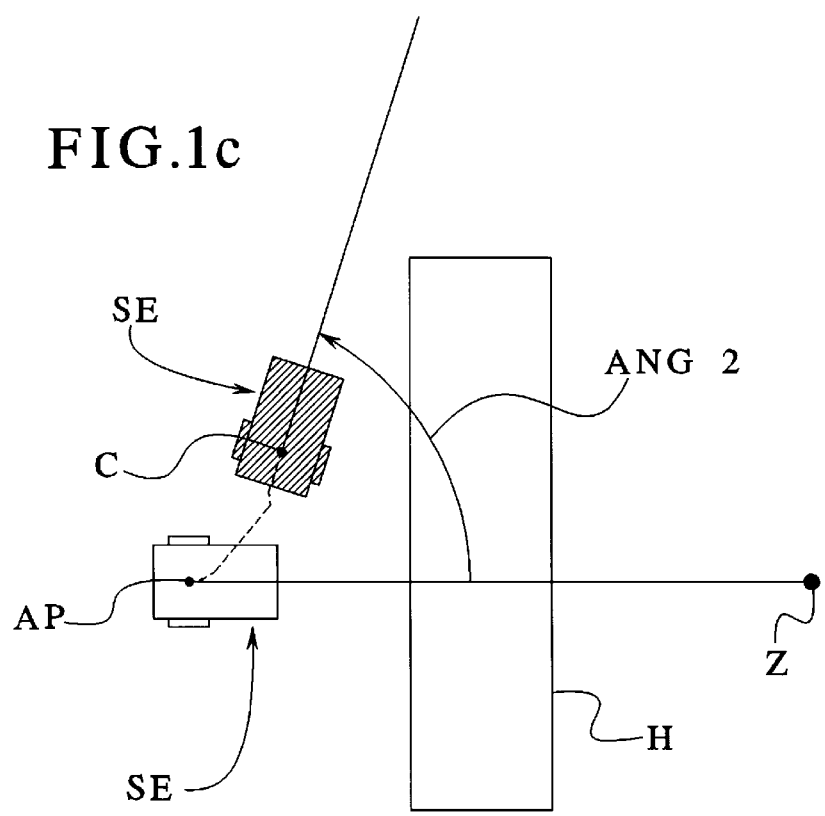

FIG. 1c shows the next step on the path of the self-propelled mobile unit SE to the destination Z. After it has made two abortive attempts to move around the obstacle H with the first directional deviation limit as a barrier, the directional deviation limit is incremented and, as shown in FIG. 1c, the self-propelled mobile unit SE returns to a point AP of departure. Proceeding from this point AP, it reaches the point C and now detects in the acquisition range of its range-measuring sensors that the obstacle H can be avoided in the selected direction of travel.

Figure 1D:
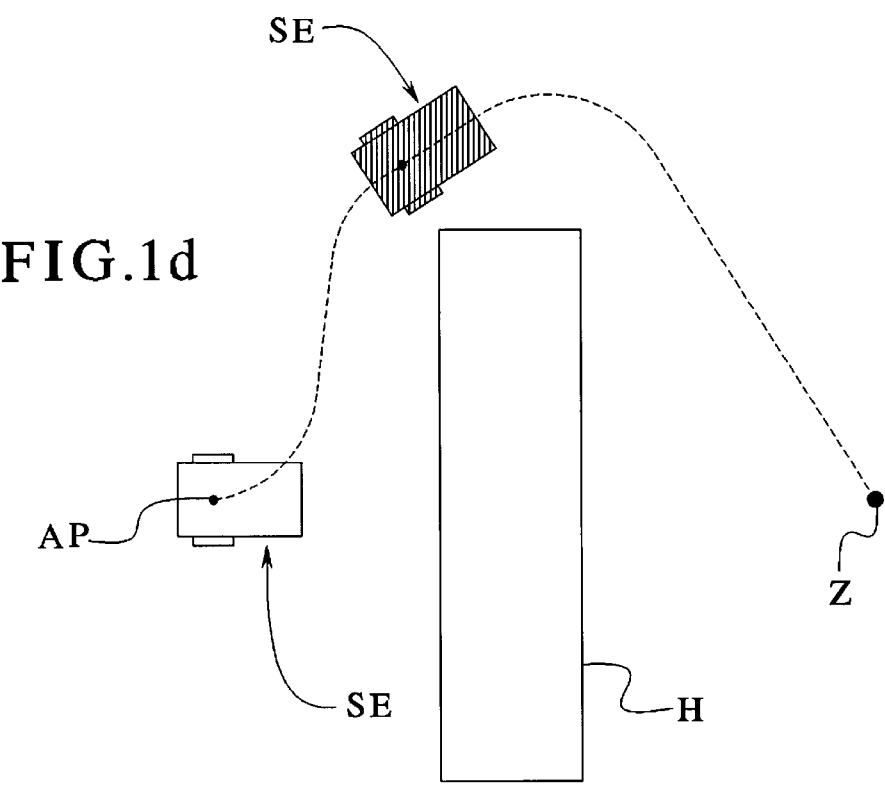

In FIG. 1d, the further travel path D of the self-propelled mobile unit to the destination Z is depicted. Proceeding from point C, for example, the self-propelled mobile unit can reach its destination in that a wall tracking program is provided in the control unit of the self-propelled mobile unit, this wall tracking program being activated at point C. This wall tracking program remains activated until the obstacle H has been rounded and a return can be made to the original travel direction in the direction of the destination Z. One advantage in the application of the inventive method is that the self-propelled mobile unit need not carry a detailed environment map along in its controller. The avoidance of the obstacle can ensue only on a reactive level, as provided in the present invention. Only knowledge of the geometrical dimensions of the self-propelled mobile unit SE and the distances from obstacles in the environment are required. It is an advantage of the method of the present invention that the situation is prevented wherein the unit constantly pivots back and forth given extensive obstacles and remains captured in an endless loop in the avoidance procedure.

Figure 2:
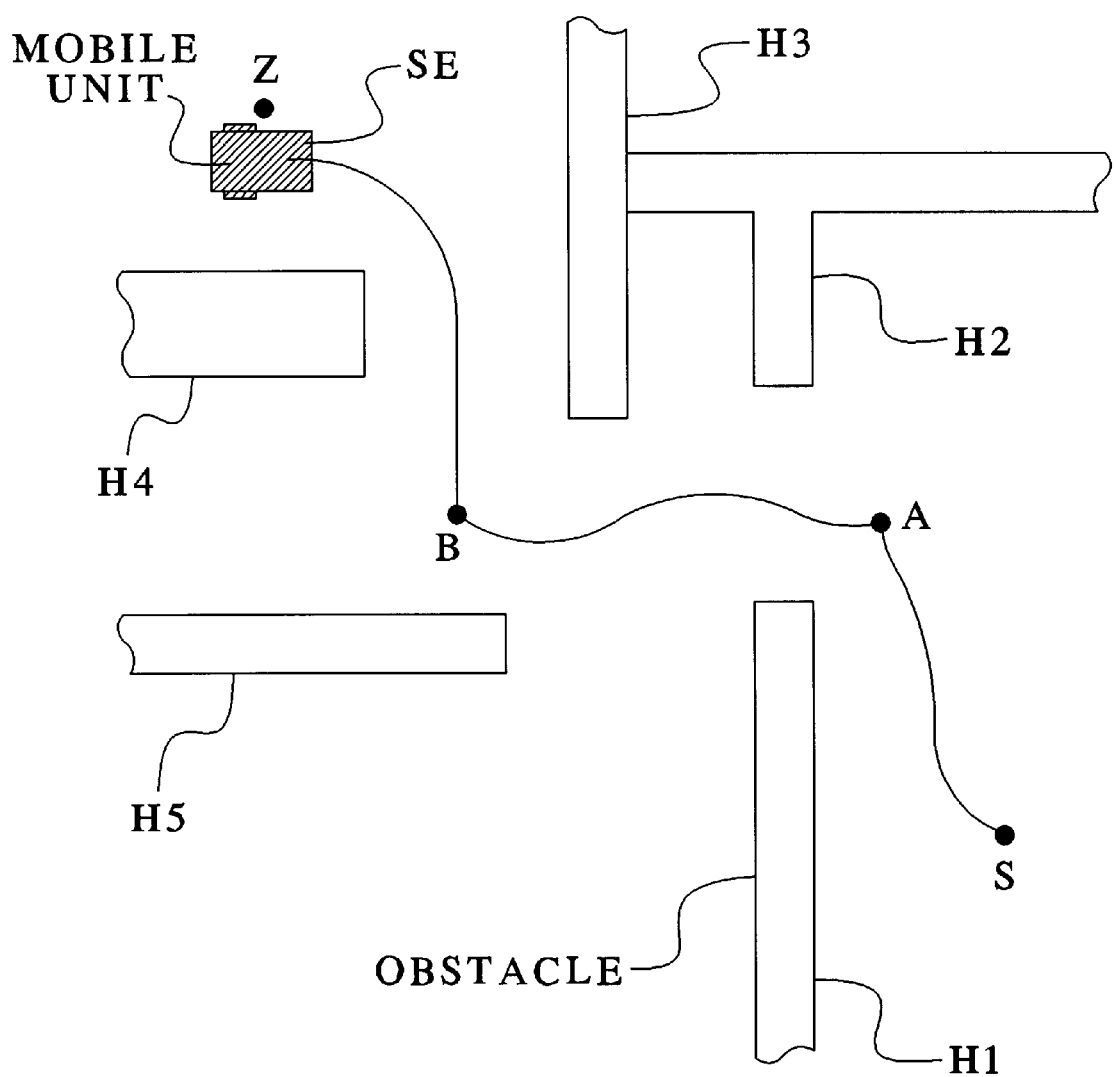
FIG. 2 depicts a further example of the path finding of a self-propelled mobile unit according to the present invention.

FIG. 2 shows a further motion event of a self-propelled mobile unit SE from a starting location S to a destination location Z. Five obstacles H1 through H5 are present in the environment. Proceeding from the starting location S, the self-propelled mobile unit SE first starts out in the destination direction and decides in favor of the left-hand path at point P1 after an avoidance procedure in the right-hand direction. The mobile unit SE then decides in favor of the right-hand path at point P2 after an avoidance procedure in the left-hand direction. The avoidance procedures, as detailed in FIGS. 1a, 1b, and 1c, are schematically represented by zones Z1, Z2, Z3, Z4 and Z5, respectively corresponding to point P1, P2, P3, P4 and P5.

As depicted in FIG. 2, the destination Z is reached on a direct path with the inventive procedure. It should be especially noted that no knowledge whatsoever in the form of a global environment map need be present and that the self-propelled mobile unit only executes minor avoidance maneuvers. It may also be seen that no endless loops result in which the self-propelled mobile unit could be captured given an avoidance maneuver.

The present invention is not limited to the particular details of the method depicted and other modifications and applications are contemplated. Certain other changes may be made to the above described method without departing from the true spirit and scope of the invention herein involved. It is intended, therefore, that the subject matter in the above depiction shall be interpreted as illustrative and not in a limiting sense.

What is claimed is:

1. A method for moving a self-propelled mobile unit relative to an obstacle, comprising the steps of:

moving the self-propelled mobile unit in a predetermined direction until it encounters an obstacle in its path;

deviating the self-propelled mobile unit from the predetermined direction in a first direction, by a predetermined angle which is different from the predetermined direction, proceeding from a point of departure in front of the obstacle;

moving the self-propelled mobile unit in the first direction;

returning the self-propelled mobile unit, if the self-propelled mobile unit encounters the obstacle, to the point of departure, deviating the self-propelled mobile unit from the predetermined direction in a second direction, by the predetermined angle which is different than the first direction and which is different from the predetermined direction, proceeding from the point of departure;

moving the self-propelled mobile unit in the second direction;

returning the self-propelled mobile unit, if the self-propelled mobile unit encounters the obstacle, to the point of departure;

incrementing the predetermined angle after respectively two abortive attempts; and repeatedly moving the self-propelled mobile unit in the first direction and then in the second direction and then incrementing the predetermined angle, until the self-propelled mobile unit does not encounter the obstacle.

* * * * *